United States Patent
Lu et al.

(10) Patent No.: US 11,624,967 B1
(45) Date of Patent: Apr. 11, 2023

(54) HYBRID ADAPTIVE LENSES FOR HEAD-MOUNTED DISPLAYS

(71) Applicant: Meta Platforms Technologies, LLC, Menlo Park, CA (US)

(72) Inventors: Lu Lu, Kirkland, WA (US); Andrew John Ouderkirk, Redmond, WA (US); Scott Charles McEldowney, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/834,818

(22) Filed: Jun. 7, 2022

Related U.S. Application Data

(63) Continuation of application No. 17/136,649, filed on Dec. 29, 2020, now Pat. No. 11,353,768, which is a continuation of application No. 15/873,765, filed on Jan. 17, 2018, now Pat. No. 10,942,416.

(51) Int. Cl.
  *G02F 1/29* (2006.01)
  *G02B 26/00* (2006.01)
  *G02B 3/14* (2006.01)

(52) U.S. Cl.
  CPC ............ *G02F 1/29* (2013.01); *G02B 3/14* (2013.01); *G02B 26/004* (2013.01); *G02F 2203/01* (2013.01); *G02F 2203/18* (2013.01)

(58) Field of Classification Search
  CPC .... G02F 2203/18; G02F 2203/01; G02F 1/29; G02B 26/004; G02B 3/14
  See application file for complete search history.

(56) References Cited

U.S. PATENT DOCUMENTS

| | | | |
|---|---|---|---|
| 5,097,352 A | 3/1992 | Takahashi et al. | |
| 5,150,234 A * | 9/1992 | Takahashi | G02F 1/29 349/1 |
| 7,404,636 B2 * | 7/2008 | Blum | C07K 16/244 351/41 |
| 2002/0041445 A1 | 4/2002 | Nishioka et al. | |
| 2002/0181126 A1 * | 12/2002 | Nishioka | G02F 1/1334 359/726 |
| 2006/0280100 A1 * | 12/2006 | Ooi | G11B 7/1275 |
| 2012/0099205 A1 | 4/2012 | Bae et al. | |

(Continued)

OTHER PUBLICATIONS

Final Office Action dated Aug. 19, 2020 for U.S. Appl. No. 15/873,765, filed Jan. 17, 2018, 16 pages.

(Continued)

*Primary Examiner* — Jonathan Y Jung
(74) *Attorney, Agent, or Firm* — Morgan, Lewis & Bockius LLP

(57) ABSTRACT

A hybrid lens includes a transmissive adaptive liquid lens and an optical element including liquid crystals. The adaptive liquid lens includes a layer of optical fluid on a substrate. A focal length of the adaptive liquid lens is adjustable. The optical element including liquid crystals is optically coupled with the adaptive liquid lens. The optical element including liquid crystals is configured to adjust a refractive index across the optical element including liquid crystals in conjunction with adjusting the focal length of the adaptive liquid lens so that the optical element reduces optical artifacts caused by the adaptive liquid lens.

19 Claims, 9 Drawing Sheets

(56) References Cited

U.S. PATENT DOCUMENTS

2012/0127062 A1* 5/2012 Bar-Zeev ........... G02B 27/0172
                                                     345/6
2013/0044043 A1   2/2013 Abdollahi et al.
2017/0131569 A1   5/2017 Aschwanden et al.
2019/0369303 A1  12/2019 Zhao et al.

OTHER PUBLICATIONS

Final Office Action dated Feb. 7, 2020 for U.S. Appl. No. 15/873,765, filed Jan. 17, 2018, 14 pages.
Non-Final Office Action dated Sep. 17, 2021 for U.S. Appl. No. 17/136,649, filed Dec. 29, 2020, 13 pages.
Notice of Allowance dated Feb. 7, 2022 for U.S. Appl. No. 17/136,649, filed Dec. 29, 2020, 13 pages.
Notice of Allowance dated Nov. 12, 2020 for U.S. Appl. No. 15/873,765, filed Jan. 17, 2018, 11 pages.
Office Action dated May 15, 2020 for U.S. Appl. No. 15/873,765, filed Jan. 17, 2018, 14 pages.
Office Action dated Aug. 30, 2019 for U.S. Appl. No. 15/873,765, filed Jan. 17, 2018, 12 pages.

* cited by examiner

HYBRID ADAPTIVE LENSES FOR HEAD-MOUNTED DISPLAYS

RELATED APPLICATIONS

This application is a continuation application of U.S. patent application Ser. No. 17/136,649, filed Dec. 29, 2020, entitled "Hybrid Adaptive Lenses for Head-Mounted Displays," which is a continuation application of U.S. patent application Ser. No. 15/873,765, filed Jan. 17, 2018, now U.S. Pat. No. 10,942,416, entitled "Hybrid Adaptive Lenses for Head-Mounted Displays," each of which is incorporated by reference in its entirety.

TECHNICAL FIELD

This relates generally to lenses, and more specifically to adaptive lenses used in head-mounted display devices.

BACKGROUND

Head-mounted display devices (also called herein head-mounted displays) are gaining popularity as a means for providing visual information to a user.

Virtual reality head-mounted displays simulate virtual environments and augmented reality head-mounted displays present virtual images overlapping with a real world view. Both systems require stereoscopic images displayed on a display of a head-mounted device to illustrate an illusion of depth. Displaying such images requires varifocal optical elements.

SUMMARY

There is a need for varifocal optical elements for virtual and augmented reality head-mounted devices that adjust focus of light emitted by the display device such that it appears at a particular focal distance. The optical elements are required to adjust the focal distance very fast and produce images with high optical quality, thereby enhancing the user's virtual reality and/or augmented reality experience.

Adaptive liquid lenses have a number of properties that make them desirable candidates for varifocal elements of head-mounted display devices. Such properties include a large aperture, light weight, large optical power, high image quality and fast adjustment of a focal distance. However, adaptive liquid lenses suffer from a number of challenges that limit their use in head-mounted displays. For example, liquid lenses are susceptible to a gravity effect (e.g., when positioned in a vertical orientation), a temperature effect, and/or, over time, a creep effect.

The above deficiencies and other problems associated with liquid lenses are reduced or eliminated by the hybrid adaptive lenses described herein. In some embodiments, the hybrid adaptive lenses are included in a display device. In some embodiments, the device is a head-mounted display device. In some embodiments, the device is portable.

In accordance with some embodiments, a method includes adjusting a focal length of an adaptive liquid lens that includes a layer of optical fluid on a substrate, and in conjunction with adjusting the focal length of the adaptive liquid lens, adjusting a liquid crystal element coupled with the adaptive liquid lens. The method also includes transmitting light through the adaptive liquid lens and the liquid crystal element.

In accordance with some embodiments, a hybrid lens includes an adaptive liquid lens and a liquid crystal element coupled with the adaptive liquid lens. The adaptive liquid lens includes a layer of optical fluid on a substrate, where a focal length of the adaptive liquid lens is adjustable.

In accordance with some embodiments, a head-mounted display device includes a hybrid lens described herein.

Thus, the described hybrid lenses of the present disclosure provide optical elements including an adaptive liquid lens with reduced optical artifacts.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1:
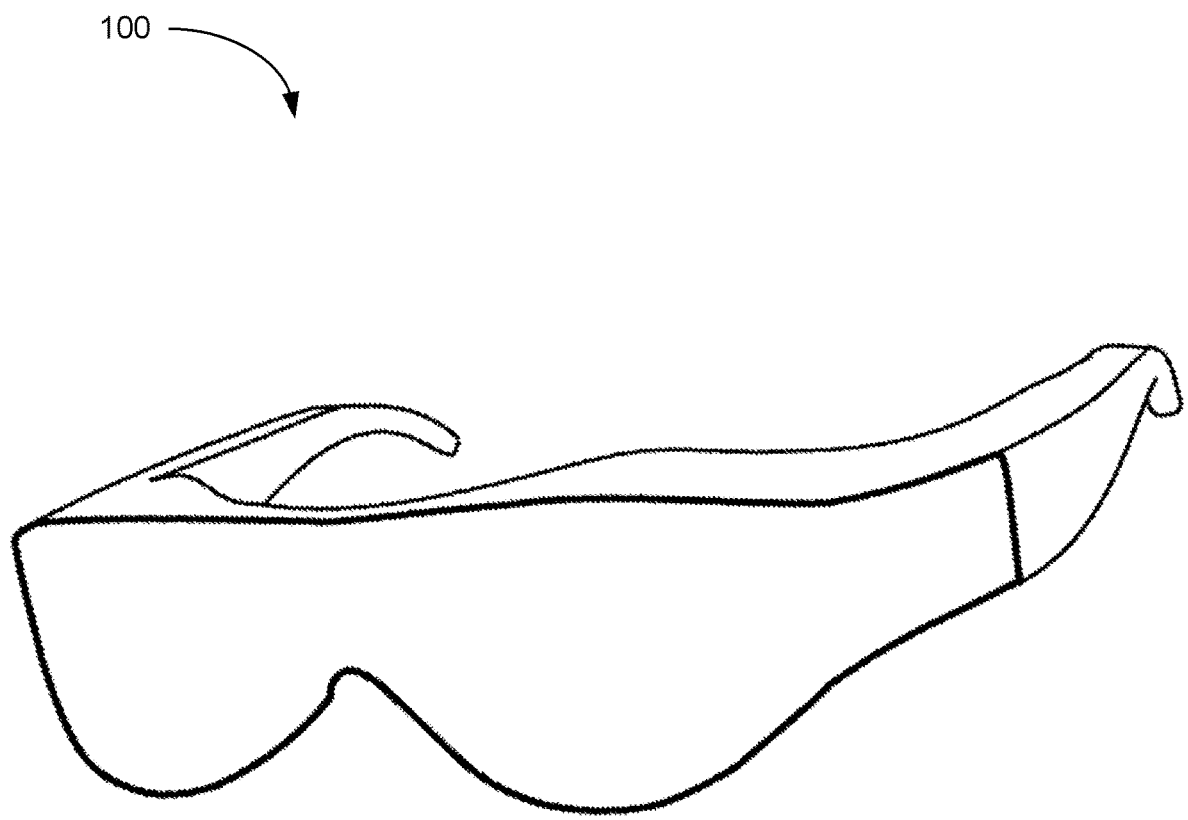
FIG. 1 is a perspective view of a display device in accordance with some embodiments.

These figures are not drawn to scale unless indicated otherwise.

DETAILED DESCRIPTION

Head-mounted display devices require varifocal optical elements that are capable of adjusting a focal distance of light for displaying stereoscopic computer-generated virtual and/or augmented reality images. For example, augmented reality head-mounted display devices require varifocal optical elements for displaying virtual images overlapping with a real world view at a specific distance for an eye of a user to accommodate when focusing on objects at different depths. Virtual reality head-mounted display devices require varifocal optical elements for correctly rendering or otherwise compensating for vergence-accommodation conflicts. Varifocal optical elements for resolving vergence-accommodation conflicts in virtual and/or augmented reality head-mounted devices are described in U.S. Patent Application No. 62,372,387, titled "Focus Adjusting Liquid Crystal Lenses in a Head-Mounted Display," filed Aug. 9, 2016, the contents of which are herein incorporated by reference in their entirety.

Adaptive liquid lenses have a number of desirable properties for varifocal optical elements of head-mounted display devices. For example, liquid lenses provide high quality images without haze, and have a large aperture size (e.g., equal to or larger than 4 cm), large optical power (±2D), and fast adjustment of focus (e.g., an adjustment speed of less than 300 ms). Liquid lenses, especially liquid lenses with a large aperture size, are susceptible to optical artifacts caused by temperature fluctuations, gravity and/or, over time, a creep effect that limit the use of liquid lenses in head-mounted display devices. Liquid lenses can be heavy and thick compared to liquid crystal lenses. Such challenges and other problems associated with liquid lenses are reduced or eliminated by the hybrid adaptive lenses described herein.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first lens could be termed a second lens, and, similarly, a second lens could be termed a first lens, without departing from the scope of the various described embodiments. The first lens and the second lens are both lenses, but they are not the same lens.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on the head of a user (e.g., by having the form of spectacles or eyeglasses, as shown in FIG. 1) or to be included as part of a helmet that is to be worn by the user. When display device 100 is configured to be worn on the head of a user or to be included as part of a helmet, display device 100 is called a head-mounted display. Alternatively, display device 100 is configured for placement in proximity to an eye or eyes of the user at a fixed location, without being head-mounted (e.g., display device 100 can be mounted in a vehicle, such as a car or an airplane, for placement in front of an eye or the eyes of the user).

In some embodiments, display device 100 includes one or more components described below with respect to FIG. 2. In some embodiments, display device 100 includes additional components not shown in FIG. 2.

Figure 2:
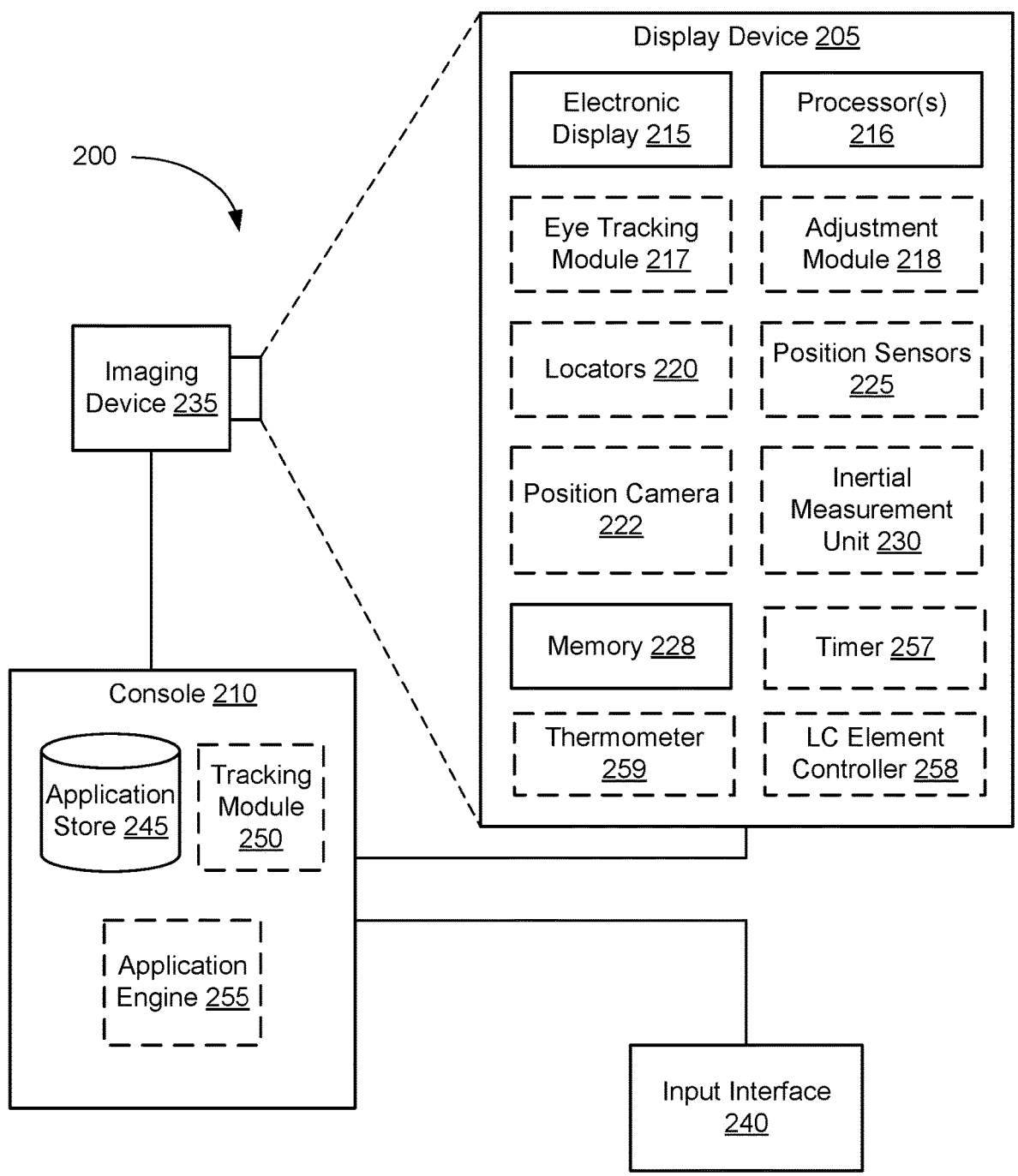
FIG. 2 is a block diagram of a system including a display device in accordance with some embodiments.

FIG. 2 is a block diagram of system 200 in accordance with some embodiments. The system 200 shown in FIG. 2 includes display device 205 (which corresponds to display device 100 shown in FIG. 1), imaging device 235, and input interface 240 which are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging device 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in or allowing in a view of the real surroundings. Thus, display device 205 and system 200 described here can deliver virtual reality, mixed reality, and augmented reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 may operate as a virtual reality (VR) device, an AR device, as glasses or as some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, timer 257, thermometer 259, liquid crystal (LC) element controller 258, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM, or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable electronic display element or multiple adjustable electronic displays elements (e.g., a display for each eye of a user).

In some embodiments, the display element includes one or more light emission devices and a corresponding emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, a laser, a fluorescent light source, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more lenses direct light from the arrays of light emission devices (optionally through the emission intensity arrays) to locations within each eyebox and ultimately to the back of the user's retina(s). An eyebox is a region that is occupied by an eye of a user located proximate to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is also used to determine the location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, this sends a discrete image to the display that will tile subimages together, thus, a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display not to pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough not to substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

Inertial Measurement Unit (IMU) 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable types of sensors that detect motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so that it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Timer 257 is configured to measure the duration of certain processes of display device 205. In some embodiments, timer 257 measures processes involved with adaptive liquid lenses included in display device 205, such as those described below with respect to FIGS. 5A-6C. For example, timer 257 measures a duration of stress applied to an adaptive liquid lens. In some embodiments, timer 257 determines an age of an adaptive liquid lens based on a timestamp indicating the time of manufacture of the adaptive liquid lens. Thermometer 259 measures the temperature of display device 205, or specific components of display device, such as electronic display 215 and or other components. In some embodiments, thermometer 259 measures the temperature of lenses included in display device 205 (e.g., adaptive liquid lenses described below with respect to FIGS. 5A-6C). LC Element Controller 258 controls LC optical elements included in display device 205, such as those described below with respect to FIGS. 5B-5C and FIG. 7. In some embodiments, LC element controller 258 applies a spatially variable voltage (V) to liquid crystal elements to adjust the refractive index of the liquid crystal elements.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Optionally, imaging device 235 is configured to detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, a touch controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received or console 210 may communicate instructions to input interface 240 to cause input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, educational applications, video playback application, or other suitable applications.

When tracking module 250 is included in console 210, tracking module 250 calibrates system 200 using one or more calibration parameters, and may adjust one or more calibration parameters to reduce error in the determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3:
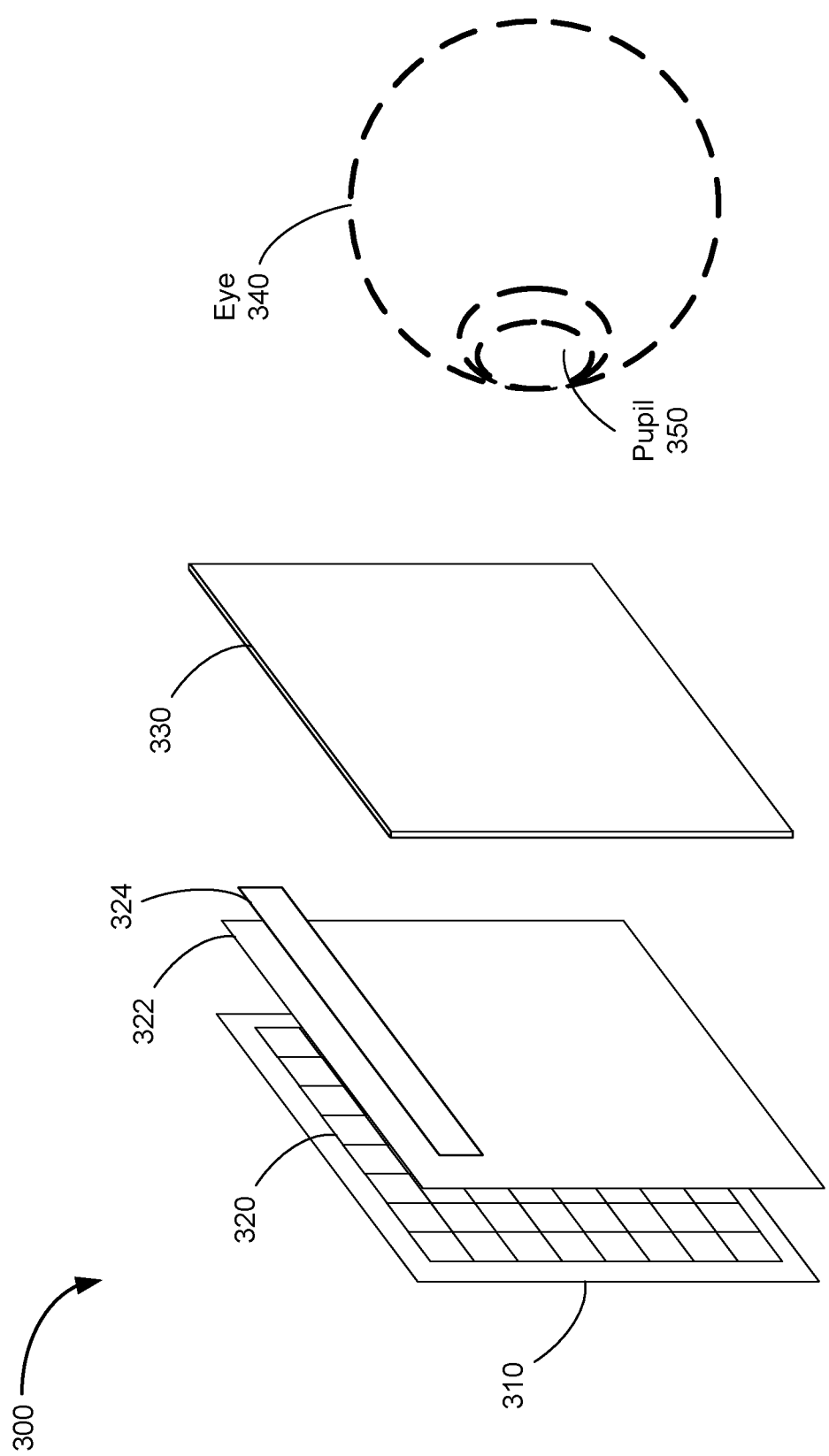
FIG. 3 is an isometric view of a display device in accordance with some embodiments.

FIG. 3 is an isometric view of display device 300 in accordance with some embodiments. In some other embodiments, display device 300 is part of some other electronic display (e.g., digital microscope, a mobile device, a smartphone, etc.). In some embodiments, display device 300 includes light emission device array 310 and one or more lenses 330. In some embodiments, display device 300 also includes emission intensity array 322 and IR detector array 324.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR).

Emission intensity array 322 is configured to selectively attenuate light emitted from light emission array 310. In some embodiments, emission intensity array 322 is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation and/or at some intermediate level of attenuation. In this manner emission intensity array 322 is able to control what portion of the image light emitted from light emission device array 310 is passed to the one or more lenses 330. In some embodiments, display device 300 uses emission intensity array 322 to facilitate providing image light to a location of pupil 350 of eye 340 of a user and to minimize the amount of image light provided to other areas in the eyebox.

One or more lenses 330 receive the modified image light (e.g., attenuated light) from emission intensity array 322 (or directly from emission device array 310), and direct the shifted image light to a location of pupil 350.

Optional IR detector array 324 detects IR light that has been retro-reflected from the retina of eye 340, a cornea of eye 340, a crystalline lens of eye 340, or some combination thereof. IR detector array 324 includes either a single IR sensor or a plurality of IR sensitive detectors (e.g., photodiodes). In some embodiments, IR detector array 324 is separate from light emission device array 310. In some embodiments, IR detector array 324 is integrated into light emission device array 310.

In some embodiments, light emission device array 310 and emission intensity array 322 make up a display element. Alternatively, the display element includes light emission device array 310 (e.g., when light emission device array 310 includes individually adjustable pixels) without emission intensity array 322. In some embodiments, the display element additionally includes the IR array. In some embodiments, in response to a determined location of pupil 350, the display element adjusts the emitted image light such that the light output by the display element is refracted by one or more lenses 330 toward the determined location of pupil 350, and not toward other locations in the eyebox.

As explained above, adaptive liquid lenses are desirable candidates as varifocal optical elements for adjusting the focal distance of light emitted by displays of head-mounted display devices. However, the adaptive liquid lenses have a number of challenges that limit their use, as will be described below with respect to FIGS. 4A-4C.

Figure 4A:
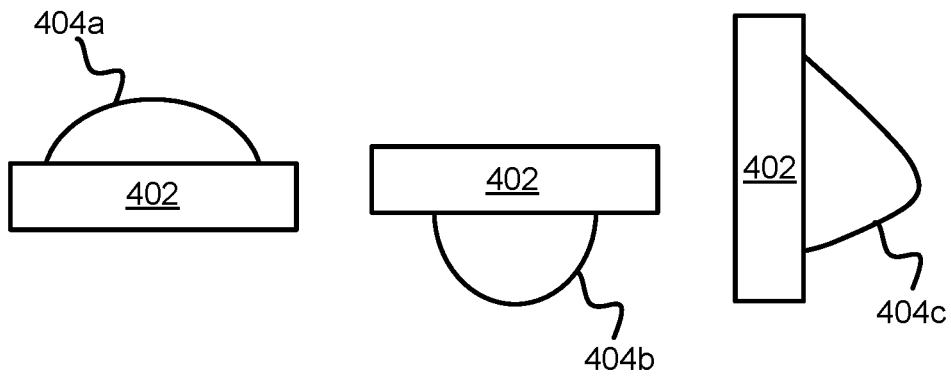
FIG. 4A is a schematic illustration of a gravity effect of liquid lenses in accordance with some embodiments.

FIG. 4A is a schematic illustration of a gravity effect of liquid lenses in accordance with some embodiments. FIG. 4A illustrates three liquid lenses (e.g., droplets 404a, 404b and 404c) made of an optically transparent fluid, and disposed on substrate 402 in three different orientations: on a horizontal surface (droplet 404a), below a horizontal surface (droplet 404b) and in a vertical direction (droplet 404c). As shown in FIG. 4A, gravity force distorts shapes of droplets 404b and 404c compared to the horizontally oriented droplet 404a. Droplet 404c in a vertical direction has a asymmetric distorted shape. Such distortions modify the focal distance and thereby optical power of a liquid lens, resulting in optical artifacts. In a head-mounted display device, the orientation of the lens is expected to be in a vertical or nearly vertical direction as a user is standing straight and the orientation of the lens varies according to movements of a user. Therefore, a liquid lens of a head-mounted display device is susceptible to the gravity effect and to optical artifacts caused by the gravity effect.

In addition to the gravity effect, liquid lenses are susceptible to optical artifacts caused by a temperature effect. Temperature fluctuations affect properties of an optical fluid (e.g., volatility, surface tension, and/or density) resulting in changes of volume and/or shape of the liquid lens. This causes changes in a focal distance and thereby optical power of the liquid lens resulting in optical artifacts.

Figure 4B:
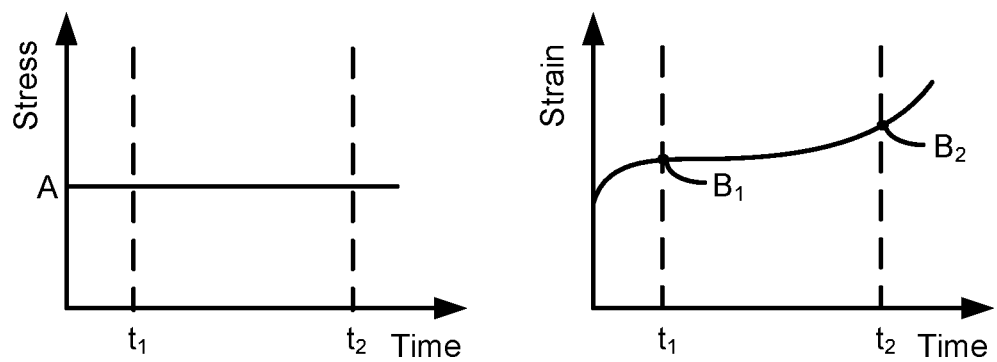
FIG. 4B is a graph illustration of a creep effect in liquid membrane lenses in accordance with some embodiments.

FIG. 4B is a graph illustration of a creep effect in liquid membrane lenses in accordance with some embodiments. A membrane lens is described in further detail below with respect to FIG. 6C. Membrane lenses are a type of adaptive liquid lenses that include a membrane. In some embodiments, membrane lenses change the focal distance by changing a shape (e.g., curvature or area) of the membrane. For example, the membrane shape can be changed from flat to curved, or from concave to convex. Also, the curvature of a lens (e.g., a concave lens) can be changed to provide a different focal distance. The membrane is typically made of an elastomeric material, such as a polymer or a silicone. Such materials are susceptible to a creep effect. As used herein, a creep effect refers to a tendency of a material to alter its response (i.e., strain) under influence of a mechanical stress over time. The left side graph of FIG. 4B illustrates a constant mechanical stress applied on a membrane of a membrane lens. For example, such constant stress may correspond to a mechanical stress required for a concave membrane to change its curvature. The right side graph of FIG. 4B illustrates an example of strain under an influence of a constant stress where the strain in response to the constant stress varies over time. For example, applying mechanical stress A on a membrane at time $t_1$ results in strain $B_1$ of the membrane causing the membrane to stretch a certain amount (e.g., a concave membrane with a first curvature stretches to a concave membrane with a second curvature). Applying the same mechanical stress A on the membrane at time $t_2$ results in strain $B_2$ of the membrane. At time $t_2$, the membrane stretches more (i.e., the concave membrane with the first curvature stretches to a concave membrane with a third curvature). In some cases, the membrane tension can initially increase and then decrease over time. Over time, the varying response to mechanical stress affects the optical power of the lens and results in optical artifacts. Another effect of the mechanical stress on the membrane is beam distortions at the edge of the optical aperture of the lens affecting optical performance.

The gravity effect, thermal effect and creep effect described herein have an impact on the overall image quality provided by an adaptive liquid lens. These effects and/or other deficiencies causing optical artifacts by a liquid adaptive lens are eliminated or reduced by the embodiments of a hybrid adaptive lens described below with respect to FIGS. 5A-5C.

Figure 5A:
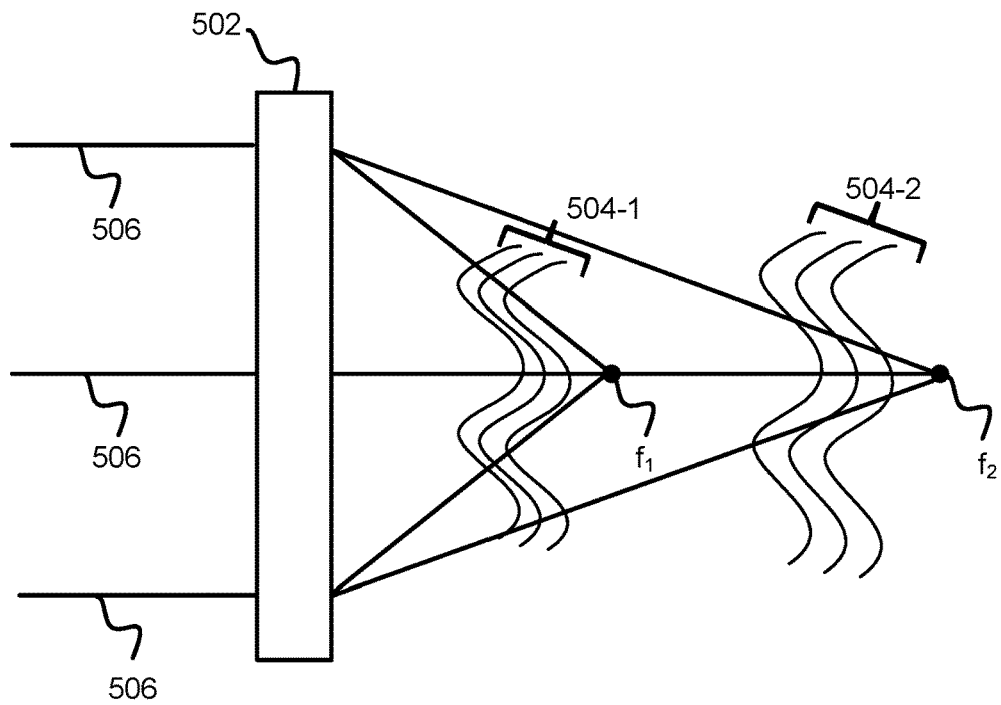
FIG. 5A is a schematic illustration of an adaptive liquid lens in accordance with some embodiments.

FIG. 5A is a schematic illustration of adaptive liquid lens 502 in accordance with some embodiments. Adaptive liquid lens 502 defines a range of focal distances between focal distances $f_1$ and $f_2$, and is configured to modify the focal distance within that range. FIG. 5A shows light 506 focused by lens 502 at focal distance $f_1$ and focal distance $f_2$. Adaptive liquid lenses used for hybrid adaptive lenses are further described below with respect to FIGS. 6A-6C. Light 506 has wave-front 504-1 when focused at focal distance $f_1$ and wave-front 504-2 when focused at focal distance $f_2$. Wave-fronts 504-1 and 504-2 are distorted. In some embodiments, wave-fronts 504-1 and 504-2 are distorted due to one or more of the effects described above with respect to FIGS. 4A-4B (i.e., the gravity effect, thermal effect, and/or creep effect). Such distorted wave-fronts are observed as optical artifacts in an image.

Figure 5B:
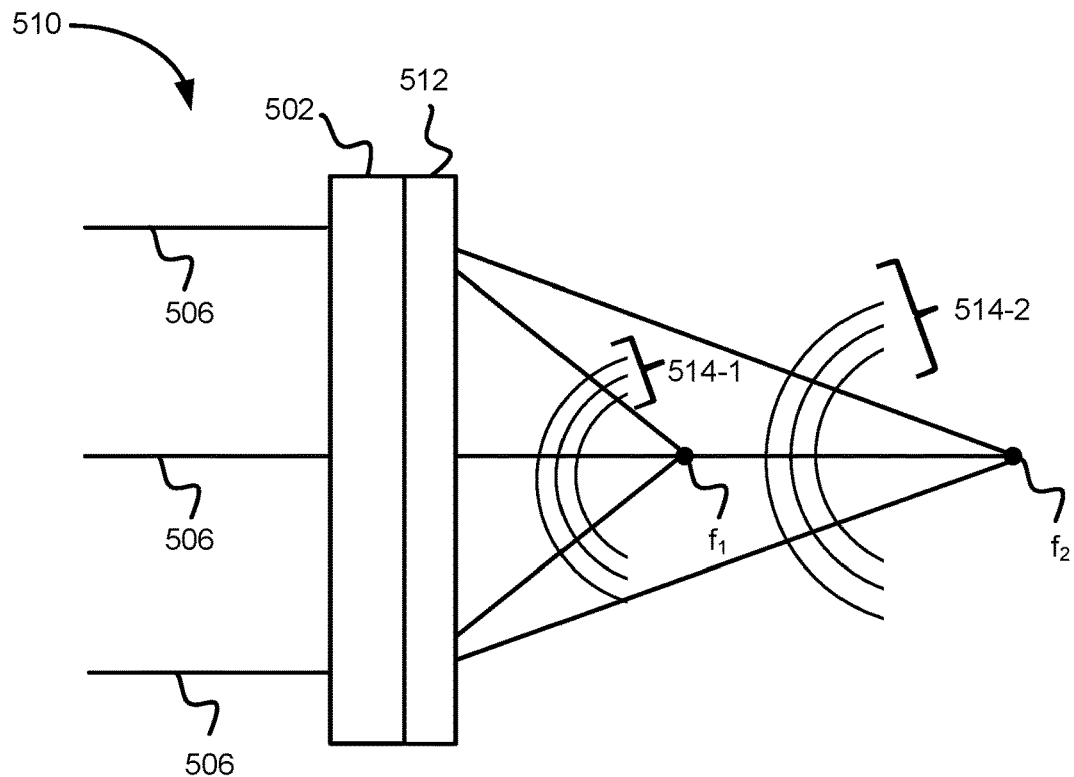
FIG. 5B is a schematic illustration of a hybrid adaptive lens in accordance with some embodiments.

FIG. 5B is a schematic illustration of hybrid adaptive lens 510 in accordance with some embodiments. In some embodiments, hybrid adaptive lens 510 corresponds to lens 330 described above with respect to FIG. 3. Hybrid adaptive lens 510 includes adaptive liquid lens 502 and liquid crystal (LC) optical element 512. In some embodiments, LC optical element 512 includes one or more wave-front correctors to correct for wave-front distortions shown by wave-fronts 504-1 and 504-2 of FIG. 5A. In FIG. 5B, wave-fronts 514-1 and 514-2 at respective focal distances $f_1$ and $f_2$ are corrected by LC optical element 512 to have smooth, spherical wave-front shapes. The wave-front correction is achieved by dynamically adjusting a spatially variable refractive index across LC optical element 512. The spatially variable refractive index compensates for spatial distortions of the wave-front. The functionality of a wave-front corrector is further described below with respect to FIG. 7.

Figure 5C:
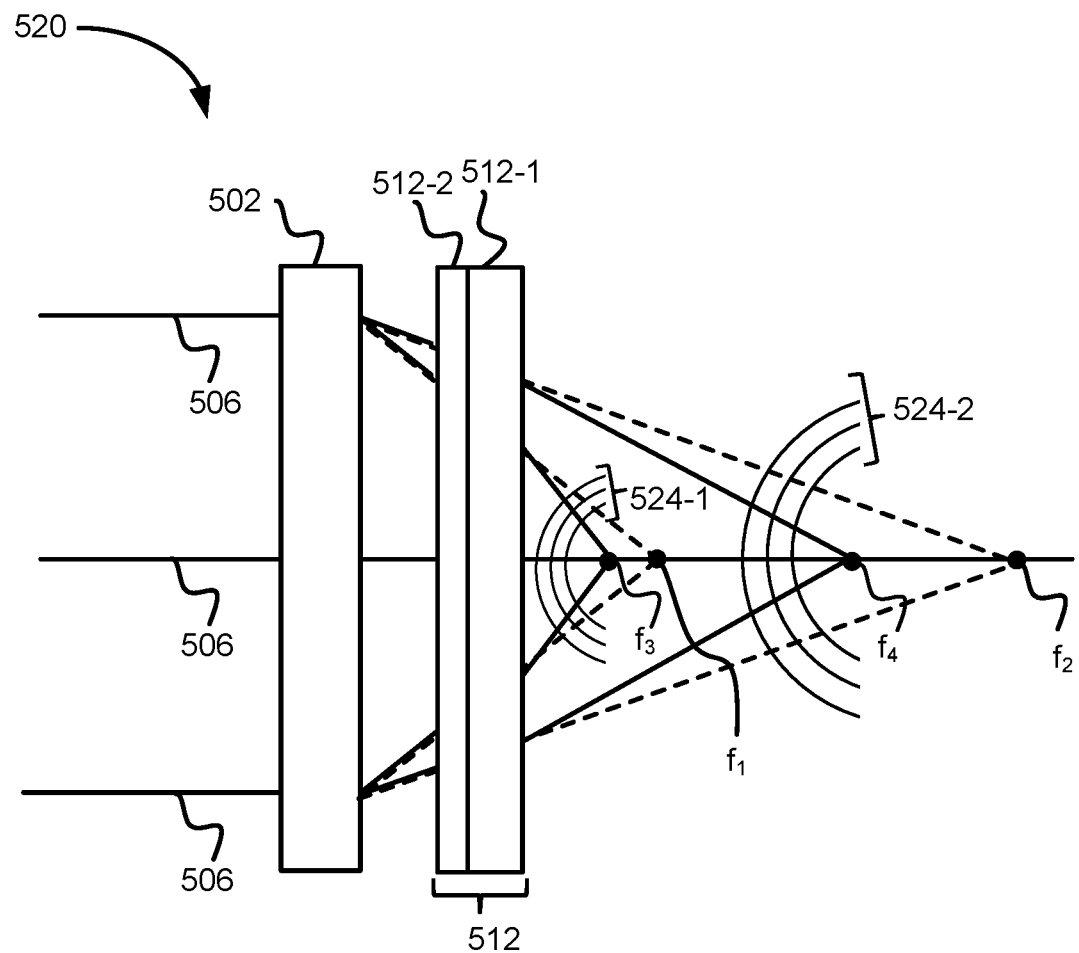
FIG. 5C is a schematic illustration of a hybrid adaptive lens in accordance with some embodiments.

FIG. 5C is a schematic illustration of hybrid adaptive lens 520 in accordance with some embodiments. Hybrid adaptive lens 520 corresponds to lens 510 described above with respect to FIG. 5B, except that LC element 512 includes wave-front corrector 512-1 and LC lens 512-2. In some embodiments, LC lens 512-2 is an adaptive LC lens. In some embodiments, LC lens 512-2 is composed of one or more layers of liquid crystals. In some embodiments, LC lens 512-2 adds to the optical power of hybrid adaptive lens 520 and increases and/or shifts the range of focal distances defined by adaptive liquid lens 502. In FIG. 5C, LC lens 512-2 shifts the focal distance range of adaptive liquid lens 502 so that focal distance $f_1$ is shifted to focal distance $f_3$ and focal distance $f_2$ is shifted to focal distance $f_4$, where focal distances $f_3$ and $f_4$ are shorter than the corresponding focal distances $f_1$ and $f_2$ of adaptive liquid lens 502 in FIG. 5A. Focal distances $f_1$ and $f_2$ are illustrated in FIG. 5D with dash lines for reference. Alternatively, LC lens 512-2 shifts the focal distance range so that focal distances $f_3$ and $f_4$ are longer than the corresponding focal distances $f_1$ and $f_2$ of adaptive liquid lens 502. In some embodiments, LC lens 512-2 expands the range of focal distances of adaptive liquid lens 502, so that focal distance $f_3$ is shorter than corresponding focal distance $f_1$ and focal distance $f_4$ is longer than the corresponding focal distance $f_2$.

Figure 6A:
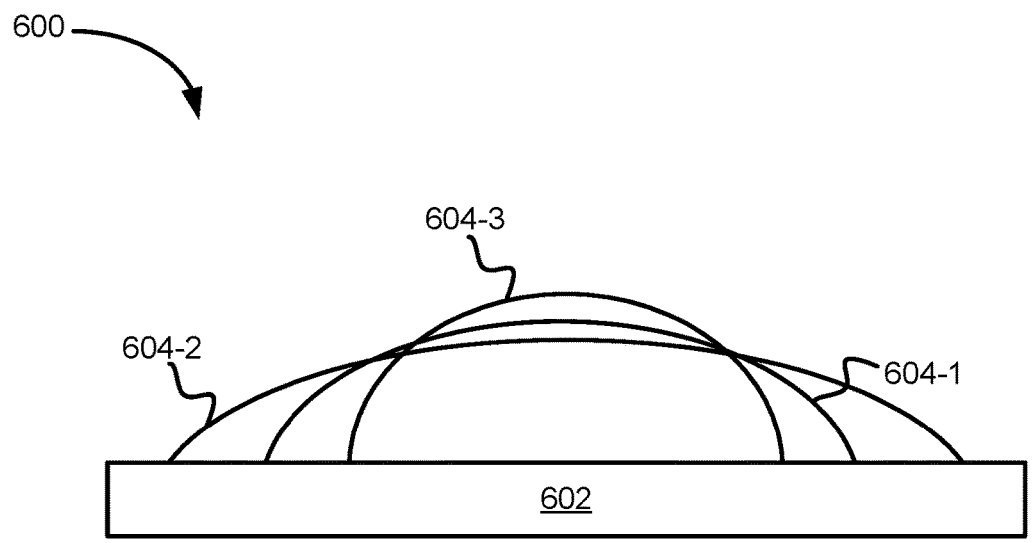
FIG. 6A is a schematic illustration of an adaptive liquid lens in accordance with some embodiments.

FIG. 6A is a schematic illustration of adaptive liquid lens 600 in accordance with some embodiments. Adaptive liquid lens 600 corresponds to adaptive liquid lens 502 of hybrid adaptive lens 510 described above with respect to FIGS. 5A-5C. Adaptive liquid lens 600 includes a droplet of an optically transparent fluid (e.g., droplet 604-1, 604-2, or 604-3) positioned on substrate 602. The focal distance of lens 600 is adjustable by adjusting a shape and/or volume of the droplet. Droplet 604-1 has a first shape corresponding to a first optical distance (e.g., focal distance $f_1$ in FIG. 5B). Droplet 604-2 has a second shape corresponding to a second optical length (e.g., focal distance $f_2$ in FIG. 5B). Droplet 604-3 has a third shape corresponding to a third optical length. In some embodiments, adaptive liquid lens 600 is an adaptive membrane lens, a dielectrophoretic, an electrowetting lens, a mechanical-wetting lens, a ferrofluidic transducer lens, hydrogel lens, electromagnetic actuator lens, electrochemical actuation lens, electrostatic force actuation lens, an acoustic liquid lens, or adaptive liquid lens of any other type.

Figure 6B:
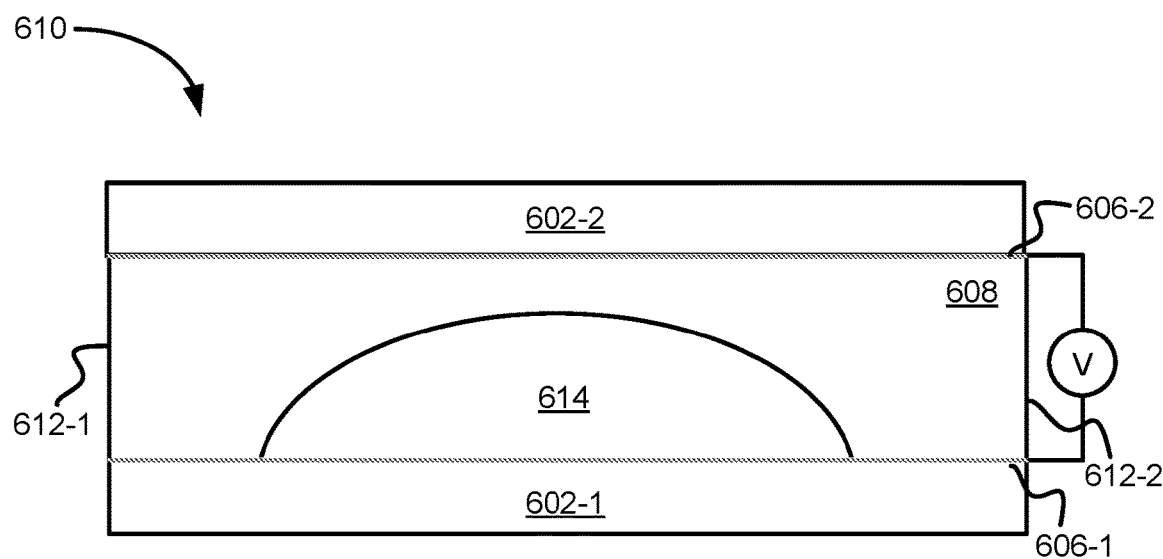
FIG. 6B is a schematic illustration of a dielectrophoretic lens in accordance with some embodiments.

FIG. 6B is a schematic illustration of dielectrophoretic lens 610 in accordance with some embodiments. Dielectrophoretic lens 610 corresponds to adaptive liquid lens 600 described above with respect to FIG. 6A. The adaptive functionality of a dielectrophoretic lens is based on dielectrophoresis. Dielectrophoresis refers to a phenomenon of placing a neutral dielectric particle in a spatially non-homogenous electric field. As a result of the non-homogenous electric field, the dielectric particle bears a dielectrophoretic force. In a dielectrophoretic lens, a force is exerted between a liquid droplet (e.g., droplet 614 of a dielectric fluid) and a surrounding medium (e.g., medium 608) where the liquid droplet and the surrounding medium have largely different dielectric constants and different refractive indexes. The dielectrophoretic force F is described by the following equation:

$$F = \frac{1}{2}\varepsilon_0(\varepsilon_d - \varepsilon_m)\nabla E^2, \quad (1)$$

wherein $\varepsilon_0$ represents vacuum permittivity, sa is a dielectric constant of a droplet, $\varepsilon_m$ is a dielectric constant of a surrounding medium, and $\nabla E$ is an electric field gradient.

Dielectrophoretic lens 610 includes an enclosure formed by substrates 602-1 and 602-2 separated by spacers 612-1 and 612-2. In some embodiments, substrates 602-1 and 602-2 are made of glass. Substrate 602-1 includes surface 606-1 including an electrode (e.g., an indium tin oxide (ITO) electrode) and a dielectric layer coated on top of the electrode. Substrate 602-2 includes surface 606-2 facing surface 606-1. Surface 606-2 also includes an electrode (e.g., an ITO electrode). Electrodes on surfaces 606-1 and 606-2 are electronically coupled. One or more droplets 614 of an optical fluid are deposited on substrate 602-1, and surrounded by surrounding liquid 608. Droplet 614 and surrounding liquid 608 are composed of an optically clear, immiscible liquid with matching densities. However, droplet 614 is composed of a liquid that has a largely different dielectric constant and a distinct refractive index than surrounding liquid 608. The focal distance of lens 610 is changed by modifying the shape of droplet 614, similarly to as illustrated by droplets 604-1, 604-2, and 604-3 in FIG. 6A, by applying a voltage (V) between electrodes of surfaces 606-1 and 606-2 to create a spatially non-homogenous electric field. In some embodiments, two or more droplets 614 form a single droplet as voltage (V) is applied.

Figure 6C:
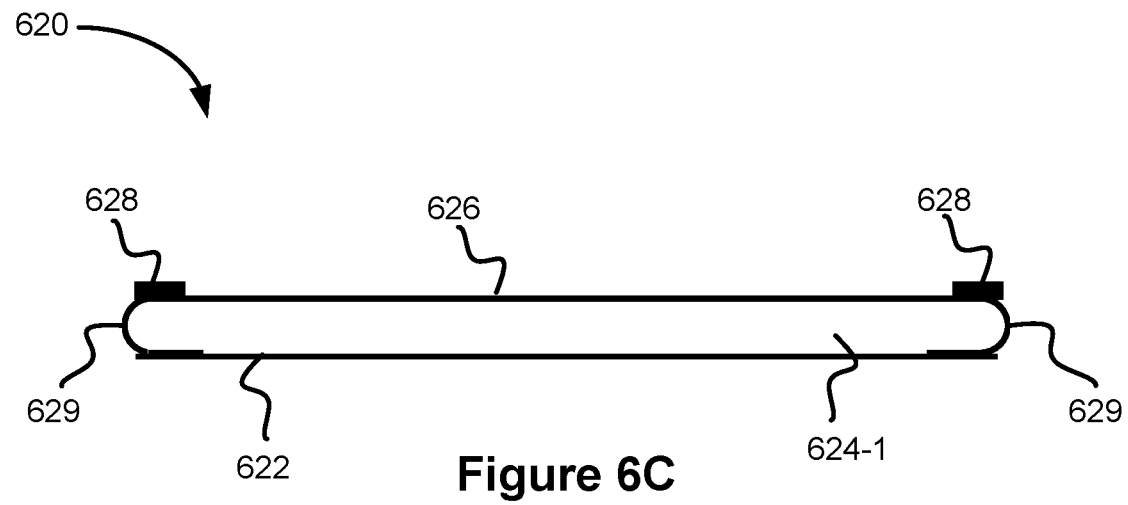
FIG. 6C-6D are schematic illustrations of a membrane lens in accordance with some embodiments.
Figure 6D:
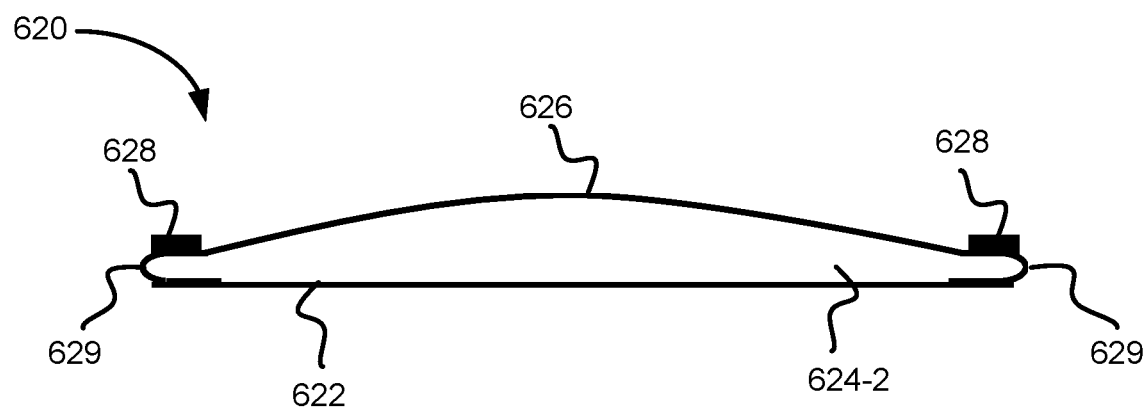

FIGS. 6C-6D are schematic illustrations of membrane lens 620 in accordance with some embodiments. In some embodiments, membrane lens 620 corresponds to adaptive liquid lens 600 described above with respect to FIG. 6A. Adaptive liquid lens 620 includes optically transparent fluid (e.g., fluids 624-1 and 624-2) positioned on substrate 602 encapsulated by membrane 626 and edge seal 629. Membrane 626 is made of an elastomeric material (e.g., membrane 626 is made of silicone or polymer). Membrane 626 defines the shape and/or volume of the optical fluid. In some embodiments, membrane 626 defines a flat shape (e.g., membrane 626 is flat in FIG. 6C), convex shape (e.g., membrane 626 has a convex shape in FIG. 6D), or concave shape. The focal distance of adaptive liquid lens 620 is configured to be adjusted by modifying the shape and/or volume of the fluid (e.g., fluids 624-1 and 624-2) encapsulated by membrane 626 and edge seal 629. Fluid 624-1 in FIG. 6C and fluid 624-2 in FIG. 6D have different shapes corresponding to different focal distances. In some embodiments, liquid lens 620 is coupled with a fluid reservoir for adjustment of a volume. In some embodiments, the shape and/or volume of the fluid is adjusted by driver 628. In some embodiments, driver 628 includes, or is coupled with, actuation mechanisms (e.g., by a syringe, a motor pump, piezoelectric pumping, artificial muscle, a voice coil motor, or any combination thereof). The adjusting of the shape and/or volume causes stress to membrane 626 and therefore, over time, results in optical artifacts arising from a creep effect described above with respect to FIG. 4B.

Figure 7:
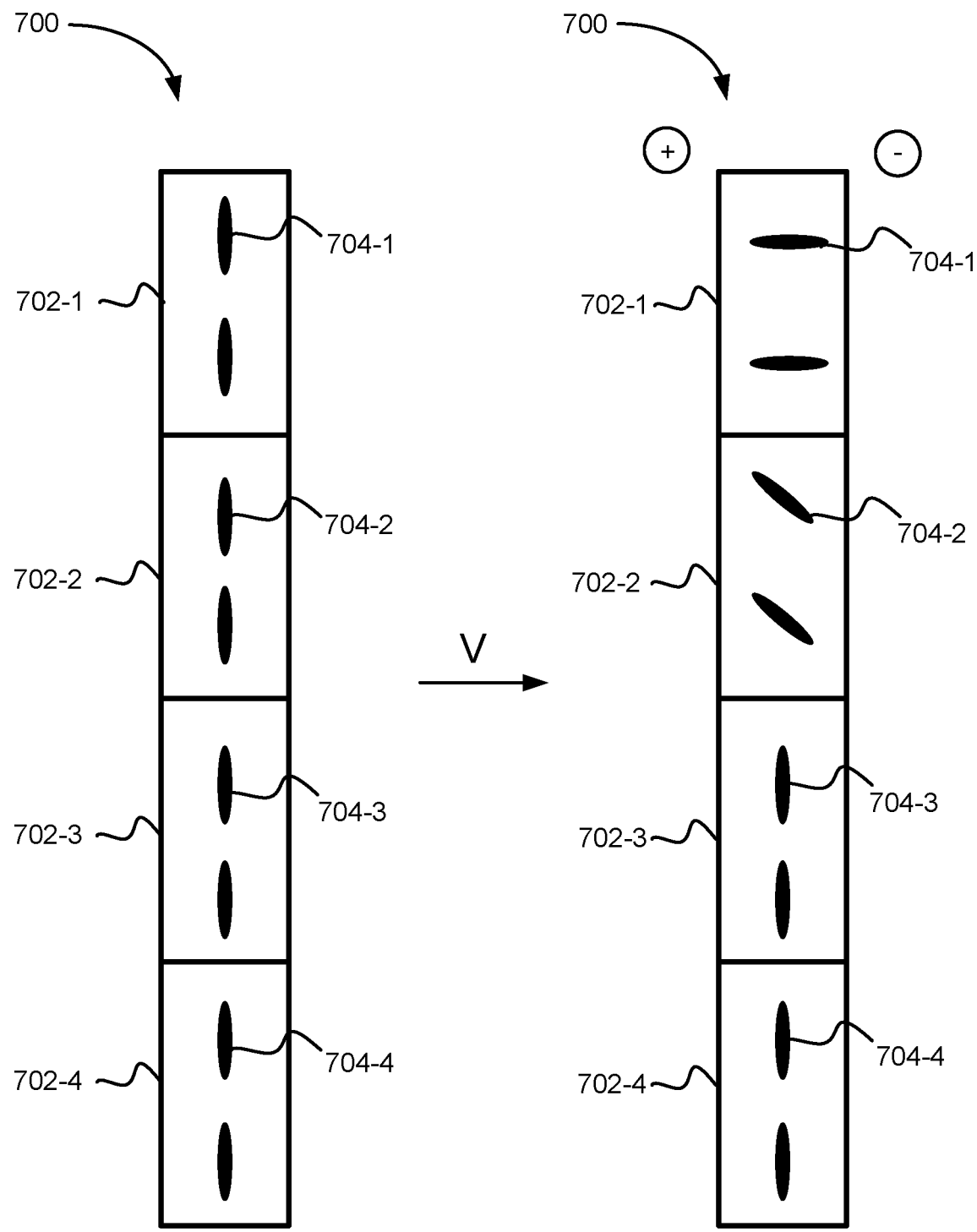
FIG. 7 is a schematic illustration of a liquid crystal wave-front corrector in accordance with some embodiments.

FIG. 7 is a schematic illustration of liquid crystal (LC) wave-front corrector 700 in accordance with some embodiments. In some embodiments, wave-front corrector 700 is included in LC element 512 described above with respect to FIG. 5B and corrects for the wave-front distortions caused by adaptive liquid lens 502 due to one or more of the effects described above with respect to FIGS. 4A-4B (i.e., the gravity effect, the thermal effect and/or creep effect) and/or other distortions. FIG. 7 illustrates wave-front corrector 700 before (left side) and after (right side) applying a voltage (V). Wave-front corrector 700 includes an array of LC cells (e.g., cells 702-1, 702-2, 702-3, and 702-4). In some embodiments, each LC cell 702-1, 702-2, 702-3, and 702-4 corresponds to a pixel. In some embodiments, each LC cell 702-1, 702-2, 702-3, and 702-4 correspond to a subpixel. In some embodiments, LC cells 702-1, 702-2, 702-3, and 702-4 are separate cells. In some embodiments, LC cells 702-1, 702-2, 702-3, and 702-4 are portions of a continuous LC element. LC cells 702-1, 702-2, 702-3, and 702-4 each include a respective plurality of liquid crystals (LCs) 704-1, 704-2, 704-3, and 704-4 oriented vertically in wave-front corrector 700 on the left side of FIG. 7. The refractive index of an LC element depends on the orientation of the LCs. The refractive index of wave-front corrector 700 is configured to be adjusted cell by cell. Such a spatially adjustable refractive index is used to compensate and/or correct for distortions of a wave-front locally. In FIG. 7, all LC cells 702-1, 702-2, 702-3, and 702-4 have LCs with same orientation corresponding to the same refractive index (e.g., refractive index $n_1$). By applying a spatially variable voltage V, the orientation of LCs 704-1, 704-2, 704-3, and 704-4 in each respective element can be modified. In FIG. 7, LCs 704-1 are oriented horizontally resulting in a second refractive index (e.g., refractive index $n_2$) and LCs 704-2 are oriented in a 40 degree angle, resulting in a third refractive index (e.g., refractive index $n_3$). The spatially variable voltage (V) does not change the orientation of LCs in cells 702-3 and 702-4, and therefore, as a result of the applied spatially variable voltage, wave-front corrector 700 includes cell 702-1 with refractive index $n_2$, cell 702-2 with refractive index $n_3$, and cells 702-3 and 702-4 with refractive index $n_1$.

With the principles explained with respect to FIG. 7, a wave-front corrector (e.g., wave-front corrector 700) included in LC element 512 of FIG. 5B corrects for wave-front distortions (e.g., wave-fronts 504-1 and 504-2 of FIG. 5A are corrected as wave-fronts 514-1 and 514-2 in FIG. 5B). The wave-front correction is controlled by a spatially variable voltage applied across LC element 512. The voltage applied is selected according to the correction required.

In some embodiments, prior to applying a voltage to the wave-front corrector, the wave-front of light 506 transmitted through adaptive liquid lens 502 is characterized with a wave-front sensor (e.g., a Shack-Hartmann wave-front sensor), and a spatially variable voltage is applied to correct for any distortions in the wave-front detected by the sensor accordingly. Furthermore, the correction can be confirmed by the wave-front sensor by characterizing the wave-front of light 506 after wave-front correction.

In some embodiments, wave-front distortions due to a gravity effect are corrected by determining an orientation of hybrid adaptive lens 510 and selecting the spatially variable voltage in accordance with the determined orientation. The orientation of hybrid adaptive lens 510, coupled with a head-mounted display device (e.g., head-mounted display device 100 shown in FIG. 1), is determined with position sensors 225 and/or IMU 230 described above with respect to FIG. 2. For example, position sensor 225 generates one or more measurement signals in response to motion of display device 205 and based on calibration data of IMU 230, it is determined that hybrid adaptive lens 510, along with display device 205, is in a tilted orientation. Based on an angle of the tilt, the gravity effect on adaptive liquid lens 502 of hybrid adaptive lens 510 is determined (e.g., based on previously collected data), and the required wave-front correction is defined. A spatially variable voltage is applied to wave-front corrector 700 of LC element 512 accordingly.

Wave-front distortions due to a temperature effect are corrected by determining the temperature of hybrid adaptive lens 510, and selecting the spatially variable voltage in accordance with the determined temperature. The temperature is determined by thermometer 259 described above with respect to FIG. 2. For example, thermometer 259 detects that the temperature of hybrid adaptive lens 510 has increased by a certain amount. The effect of the temperature increase on adaptive liquid lens 502 of hybrid adaptive lens 510 is determined (e.g., based on previously collected data), and the required wave-front correction is defined. A spatially variable voltage is applied to wave-front corrector 700 of LC element 512 accordingly.

Wave-front distortions due to a creep effect are corrected by determining a duration that adaptive liquid lens 502 (e.g., membrane liquid lens 620 described in FIG. 6C) has been exposed to a mechanical stress. The elastomeric membrane (e.g., membrane 626) of membrane lens 620 is mechanically stretched to different shapes, such as to shapes illustrated in FIG. 6C. For example, the shape of droplet 604-1 corresponds to a shape of membrane 626 without exposing the membrane to a mechanical stress, whereas shapes of droplets 604-2 and 604-3 correspond to shapes of membrane 626 when exposed to a mechanical stress. The duration of applying a mechanical stress can be measured and/or determined by timer 257 described above with respect to FIG. 2. The creep effect on adaptive liquid lens 502 is determined based on the duration, and optionally based on the amount of stress applied (e.g., based on previously collected data), and the required wave-front correction is defined. A spatially variable voltage is applied to wave-front corrector 700 of LC element 512 accordingly.

In some embodiments, the wave-front distortions due to the creep effect are corrected by determining an age of adaptive liquid lens 502, and adjusting the liquid crystal element based on the determined age. In some embodiments, the age of adaptive liquid lens 502 is determined based on a timestamp indicating a time of manufacture of adaptive liquid lens 502.

In light of these principles, we now turn to certain embodiments.

In accordance with some embodiments, a method includes adjusting a focal length of an adaptive liquid lens that includes a layer of optical fluid on a substrate and in conjunction with adjusting the focal length of the adaptive liquid lens, adjusting a liquid crystal element coupled with the adaptive liquid lens. In some embodiments, adjusting a liquid crystal element coupled with the adaptive liquid lens is for reducing optical artifacts caused by the adaptive liquid lens. For example, hybrid adaptive lens 510 includes adaptive liquid lens 502 and liquid crystal (LC) element 512 coupled with adaptive liquid lens 502 in FIG. 5B. A focal length of adaptive liquid lens 502 is adjusted between focal distances $f_1$ and $f_2$. In conjunction with adjusting the focal length of adaptive liquid lens 502, LC element 512 is adjusted to reduce optical artifacts caused by adaptive liquid lens 502. The method also includes transmitting light through the adaptive liquid lens and the liquid crystal element. For example, hybrid adaptive lens 510 transmits through light 506.

In some embodiments, the adaptive liquid lens is a liquid membrane lens or a dielectrophoretic liquid lens (e.g., adaptive liquid lens 502 in FIG. 5B is membrane lens 620 described in FIG. 6C or dielectrophoretic lens 610 described in FIG. 6B).

In some embodiments, adjusting the focal length of the adaptive liquid lens includes changing a shape of the layer of the optical fluid on the substrate. For example, adaptive liquid lens 600 adjusts a focal length by changing a shape of the optical fluid (e.g., droplets 604-1, 604-2, and 604-3 have different shapes) deposited on substrate 602 in FIG. 6A. In some embodiments, the focal length of the adaptive liquid lens includes changing a volume of the layer of the optical fluid of the substrate (e.g., changing a volume of droplet 604-1).

In some embodiments, the adaptive liquid lens includes a membrane that at least partially encapsulates the layer of optical fluid, and the shape of the layer of the optical fluid is changed by changing the curvature of the membrane. For example, membrane lens 620 includes optically transparent fluid (e.g., fluids 624-1 and 624-2) encapsulated by membrane 626 and edge seal 629 in FIGS. 6C and 6D. In FIG. 6C membrane 626 has a flat shape and in FIG. 6D membrane 626 has a convex shape.

In some embodiments, the layer of the optical fluid includes a dielectric liquid material, and adjusting the focal length of the adaptive liquid lens includes applying an electric field to the adaptive liquid lens. For example, dielectrophoretic lens 610 includes droplet 614 of a dielectric optical fluid in FIG. 6B. The focal length of dielectrophoretic lens 610 is adjusted by applying a spatially non-uniform electric field to droplet 614.

In some embodiments, adjusting the liquid crystal element includes adjusting an index of refraction of the liquid crystal element (e.g., adjusting an index of refraction of LC element 512 of hybrid adaptive lens 510 in FIG. 5B).

In some embodiments, the liquid crystal element includes a wave-front corrector, and adjusting the liquid crystal element includes adjusting the wave-front corrector to reduce optical artifacts arising from wave-front distortions of the adaptive liquid lens. For example, LC element 512 of hybrid adaptive lens 520 includes wave-front corrector 512-1, which is adjusted to reduce optical artifacts (e.g., optical artifacts arising from non-uniform wave-fronts 504-1 and 504-2 in FIG. 5A are corrected by LC element 512 in FIG. 5B).

In some embodiments, the liquid crystal element includes a liquid crystal lens, and adjusting the liquid crystal element includes modifying a focal length of the liquid crystal lens (e.g., hybrid adaptive lens 520 includes LC lens 512-2, which is adjusted to modify a focal length).

In some embodiments, adjusting the liquid crystal element includes: determining a temperature of the adaptive liquid lens, and in accordance with determining the temperature of the adaptive liquid lens, adjusting the liquid crystal element based on the determined temperature of the adaptive liquid lens. For example, the temperature of adaptive liquid lens 502 in FIG. 5B is determined (e.g., by thermometer 259 in FIG. 2). LC element 512 is adjusted based on the determined temperature to reduce optical artifacts of adaptive liquid lens 502 caused by a temperature effect.

In some embodiments, adjusting the liquid crystal element includes determining an orientation of the adaptive liquid lens, and in accordance with determining the orientation of the adaptive liquid lens, adjusting the liquid crystal element based on the determined orientation of the adaptive liquid lens. For example, an orientation of adaptive liquid lens 502 in FIG. 5B is determined (e.g., by IMU 230 and position sensors 225 in FIG. 2). LC element 512 is adjusted based on the determined orientation to reduce optical artifacts of adaptive liquid lens 502 caused by a gravity effect.

In some embodiments, determining a duration of exposing the adaptive liquid lens to a mechanical stress, and in accordance with determining the duration of exposing the adaptive liquid lens to a mechanical stress, adjusting the liquid crystal element based on the determined duration. For example, timer 257 determines a duration of exposing membrane lens 620 to a mechanical stress to stretch or shrink membrane 626 of membrane lens 620 in FIG. 6C. LC element 512 is adjusted based on the determined duration to reduce optical artifacts of adaptive liquid lens 502 caused by a creep effect.

In some embodiments, adjusting the liquid crystal element (e.g., LC element 512 in FIG. 5B) includes determining an age of the adaptive liquid lens (e.g., lens 502), and adjusting the liquid crystal element based on the determined age. In some embodiments, the age of the adaptive liquid lens is determined based on a timestamp indicating a time of manufacture of the adaptive liquid lens.

In accordance with some embodiments, a hybrid lens includes an adaptive liquid lens and a liquid crystal element coupled with the adaptive liquid lens. In some embodiments, the liquid crystal element reduces optical artifacts caused by the adaptive liquid lens. For example, hybrid adaptive lens 510 includes adaptive liquid lens 502 and LC element 512 coupled with adaptive liquid lens 502 in FIG. 5B. LC element 512 reduces optical artifacts caused by adaptive liquid lens 510. The adaptive liquid lens includes a layer of optical fluid on a substrate (e.g., adaptive liquid lens 600 includes droplet 604-1 on substrate 602). A focal length of the adaptive liquid lens is adjustable (e.g., the focal length of adaptive liquid lens 600 is adjusted by changing the shape of the droplet 604-1 to shapes of 604-2 or 604-3). In some embodiments, the adaptive liquid lens has a diameter of at least 4 cm (e.g., adaptive liquid lens 502 has a diameter of at least 4 cm in FIG. 5B).

In some embodiments, the adaptive liquid lens is a liquid membrane lens or a dielectrophoretic liquid lens (e.g., membrane lens 620 or dielectrophoretic lens 610 in FIGS. 6B and 6A, respectively).

In some embodiments, the liquid crystal element includes a liquid crystal wave-front corrector configured to reduce optical artifacts arising from wave-front distortions of the adaptive liquid lens (e.g., LC element 512 includes wave-front corrector 512-1 in FIG. 5B).

In some embodiments, the liquid crystal wave-front corrector includes an array of liquid crystal cells (e.g., LC wave-front corrector 700 includes LC cells 702-1, 702-2, 702-3, and 702-4 in FIG. 7).

In some embodiments, the liquid crystal element includes a liquid crystal lens (e.g., LC lens 512-2 in FIG. 5C). In some embodiments, the adaptive liquid lens defines a range of focal distances, wherein the adaptive liquid lens is configured to modify the focal distance within the range of focal distances. For example, LC lens 512-2 modifies focal distances $f_1$ and $f_2$ of adaptive hybrid lens 502 to focal distances $f_3$ and $f_4$, respectively, so that focal distance $f_3$ is shorter than focal distance $f_1$ and focal distance $f_4$ is shorter than $f_2$. Alternatively, LC lens 512-2 modifies focal distances $f_1$ and $f_2$ of adaptive hybrid lens 502 so that the respective modified focal distances are longer than focal distances $f_1$ and $f_2$.

In accordance with some embodiments, a head-mounted display device includes a hybrid lens described herein (e.g., head-mounted display device 100 in FIG. 1 includes hybrid adaptive lens 510 in FIG. 5B).

In some embodiments, the head-mounted display device further includes a temperature sensor configured to determine a temperature (e.g., thermometer 259 in FIG. 2), and one or more controllers configured to adjust the liquid crystal element based on the determined temperature (e.g., LC element controller 258 in FIG. 2 is configured to adjust LC element 512 in FIG. 5B).

In some embodiments, the head-mounted display device further includes an orientation sensor configured to determine an orientation of the adaptive liquid lens (e.g., position sensors 225 with IMU 230 in FIG. 2), and one or more controllers configured to adjust the liquid crystal element based on the determined orientation (e.g., LC element controller 258 in FIG. 2 is configured to adjust LC element 512 in FIG. 5B).

In some embodiments, the head-mounted display device further includes a timer configured to indicate a duration of exposing the adaptive liquid lens to a mechanical stress (e.g., timer 257 in FIG. 2), and one or more controllers configured to adjust the liquid crystal element based on the determined duration (e.g., LC element controller 258 in FIG. 2 is configured to adjust LC element 512 in FIG. 5B).

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A hybrid lens, comprising:
    a transmissive adaptive liquid lens that includes a layer of optical fluid on a substrate, wherein a focal length of the transmissive adaptive liquid lens is adjustable;
    an optical element, including liquid crystals, optically coupled with the transmissive adaptive liquid lens and configured to adjust a refractive index across the optical element in conjunction with adjusting the focal length of the transmissive adaptive liquid lens so that the optical element reduces optical artifacts caused by the transmissive adaptive liquid lens; and
    a liquid crystal lens including liquid crystals and optically coupled with the optical element, wherein a focal length of the liquid crystal lens is adjustable.

2. The hybrid lens of claim 1, wherein the liquid crystal lens is positioned between the transmissive adaptive liquid lens and the optical element including liquid crystals.

3. The hybrid lens of claim 1, wherein the liquid crystal lens is mechanically coupled with, and adjacent to, the optical element including liquid crystals.

4. The hybrid lens of claim 1, wherein:
    the transmissive adaptive liquid lens defines a first range of focal lengths and the focal length of the transmissive adaptive liquid lens is adjustable within the first range of focal lengths; and the liquid crystal lens is configured to increase or decrease a length of the first range of focal lengths so that the hybrid lens defines a second range of focal lengths distinct from the first range of focal lengths.

5. The hybrid lens of claim 1, wherein adjusting the focal length of the transmissive adaptive liquid lens includes changing a shape of the layer of optical fluid on the substrate.

6. The hybrid lens of claim 5, wherein the transmissive adaptive liquid lens includes a membrane that at least partially encapsulates the layer of optical fluid, and the shape of the layer of optical fluid is changed by changing a curvature of the membrane.

7. The hybrid lens of claim 1, wherein
the layer of optical fluid includes a dielectric liquid material, and
adjusting the focal length of the transmissive adaptive liquid lens includes applying an electric field to the transmissive adaptive liquid lens.

8. The hybrid lens of claim 1, wherein:
the optical element including liquid crystals includes a first portion and a second portion distinct and mutually exclusive from the first portion; and
adjusting the refractive index across the optical element including liquid crystals includes:
applying a first voltage across the first portion of the optical element including liquid crystals for orienting liquid crystals of the first portion of the optical element including liquid crystals in a first direction; and
applying a second voltage distinct from the first voltage across the second portion of the optical element including liquid crystal for orienting liquid crystals of the second portion of the optical element including liquid crystals in a second direction distinct from the first direction.

9. The hybrid lens of claim 8, wherein the optical element including liquid crystals includes an array of liquid crystal cells and the first portion of the optical element including liquid crystals corresponds to a first liquid crystal cell of the array of liquid crystal cells and the second portion of the optical element including liquid crystals corresponds to a second liquid crystal cell of the array of liquid crystal cells.

10. A method, comprising:
adjusting a focal length of a hybrid lens, the hybrid lens including a transmissive adaptive liquid lens, an optical element including liquid crystals optically coupled with the transmissive adaptive liquid lens, and a liquid crystal lens including liquid crystals and optically coupled with the optical element, the transmissive adaptive liquid lens including a layer of optical fluid on a substrate and having an adjustable focal length, wherein:
a focal length of the liquid crystal lens is adjustable; and
adjusting the focal length of the hybrid lens includes:
adjusting a focal length of the transmissive adaptive liquid lens;
in conjunction with adjusting the focal length of the transmissive adaptive liquid lens, adjusting a refractive index across the optical element so that the optical element reduces optical artifacts caused by the transmissive adaptive liquid lens; and
adjusting a focal length of the liquid crystal lens.

11. The method of claim 10, wherein the focal length of the liquid crystal lens is adjusted in conjunction with adjusting the focal length of the transmissive adaptive liquid lens.

12. The method of claim 10, wherein the liquid crystal lens is positioned between the transmissive adaptive liquid lens and the optical element including liquid crystals.

13. The method of claim 10, wherein the liquid crystal lens is mechanically coupled with, and adjacent to, the optical element including liquid crystals.

14. The method of claim 10, wherein:
the transmissive adaptive liquid lens defines a first range of focal lengths and the focal length of the transmissive adaptive liquid lens is adjustable within the first range of focal lengths; and
adjusting the focal length of the hybrid lens includes, by adjusting the focal length of the liquid crystal lens, shifting the first range of focal lengths and/or increasing or decreasing a length of the first range of focal lengths so that the hybrid lens defines a second range of focal lengths distinct from the first range of focal lengths.

15. The method of claim 10, wherein adjusting the focal length of the transmissive adaptive liquid lens includes changing a shape of the layer of optical fluid on the substrate.

16. The method of claim 15, wherein the transmissive adaptive liquid lens includes a membrane that at least partially encapsulates the layer of optical fluid, and changing the shape of the layer of optical fluid includes changing a curvature of the membrane.

17. The method of claim 10, wherein:
the layer of optical fluid includes a dielectric liquid material; and
adjusting the focal length of the transmissive adaptive liquid lens includes applying an electric field to the transmissive adaptive liquid lens.

18. The method of claim 10, wherein:
the optical element including liquid crystals includes a first portion and a second portion distinct and mutually exclusive from the first portion; and
adjusting the refractive index across the optical element including liquid crystals includes:
applying a first voltage across the first portion of the optical element including liquid crystals for orienting liquid crystals of the first portion of the optical element including liquid crystals in a first direction; and
applying a second voltage distinct from the first voltage across the second portion of the optical element including liquid crystal for orienting liquid crystals of the second portion of the optical element including liquid crystals in a second direction distinct from the first direction.

19. The method of claim 18, wherein the optical element including liquid crystals includes an array of liquid crystal cells and the first portion of the optical element including liquid crystals corresponds to a first liquid crystal cell of the array of liquid crystal cells and the second portion of the optical element including liquid crystals corresponds to a second liquid crystal cell of the array of liquid crystal cells.

* * * * *